United States Patent [19]

Stingelin et al.

[11] 4,439,204

[45] Mar. 27, 1984

[54] DYE SALTS

[75] Inventors: Willy Stingelin, Reinach; Peter Loew, Münchenstein, both of Switzerland

[73] Assignee: Ciba-Geigy Corporation, Ardsley, N.Y.

[21] Appl. No.: 412,741

[22] Filed: Aug. 30, 1982

[30] Foreign Application Priority Data

Sep. 11, 1981 [CH] Switzerland .................. 5899/81

[51] Int. Cl.³ .................. C08K 5/34; C09B 23/16
[52] U.S. Cl. .................. 8/497; 8/630; 8/655; 8/927; 524/565; 544/198
[58] Field of Search .................. 8/655, 497, 630; 524/565; 542/422

[56] References Cited

U.S. PATENT DOCUMENTS

| | | | |
|---|---|---|---|
| 3,597,151 | 8/1971 | Baumann et al. | 542/110 |
| 3,996,192 | 12/1976 | Hahnke et al. | 524/87 |
| 4,100,131 | 7/1978 | Manier et al. | 524/87 |
| 4,176,229 | 11/1979 | Kast | 542/222 |
| 4,251,656 | 2/1981 | Loew et al. | 542/422 |
| 4,344,879 | 8/1982 | Mohr et al. | 542/422 |

FOREIGN PATENT DOCUMENTS 2022099 12/1979 United Kingdom .

Primary Examiner—A. Lionel Clingman
Attorney, Agent, or Firm—Luther A. R. Hall

[57] ABSTRACT

The novel dye salts of the formula

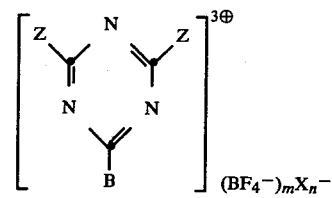

wherein Z, B, X, m and n are as defined in claim 1, are suitable for dyeing polyacrylonitrile in the spinning dope. The fibres dyed according to the invention have good fastness to rubbing, steaming, washing and light.

10 Claims, No Drawings

DYE SALTS

The present invention relates to novel dye salts of the formula I

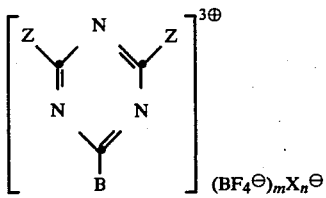

wherein Z is a radical of the formula

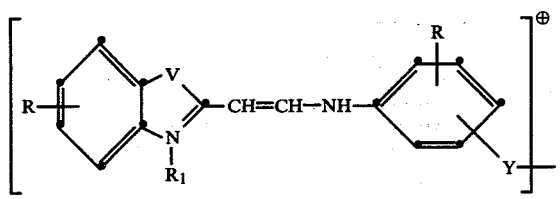

in which R is hydrogen, unsubstituted or substituted $C_1$–$C_4$alkyl, unsubstituted or substituted $C_1$–$C_4$alkoxy, the —$NO_2$ group, unsubstituted or substituted acylamino, or is halogen or the —CN group, $R_1$ is unsubstituted or substituted $C_1$–$C_4$alkyl or is $C_3$–$C_4$alkenyl, V is a sulfur atom or the group

wherein both radicals $R_1$ may be linked together to form a carbocyclic 5- or 6-membered ring, and Y is —NH—, —$NR_1$, —O— or —S—; B has the same meaning as Z or is a cationic radical which differs from Z, X is an anion other than $BF_4^\ominus$, m is 1 to 3 and n is 0 to 2.

As a cationic radical which differs from Z, B may be e.g. a radical of the formula

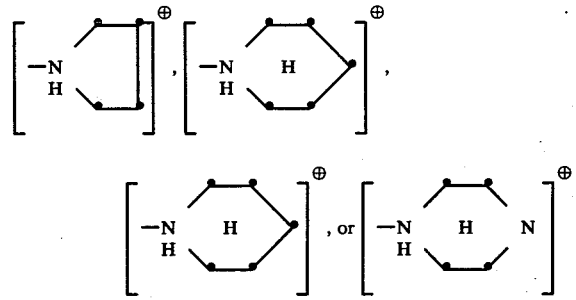

and, in particular, a radical of the formula

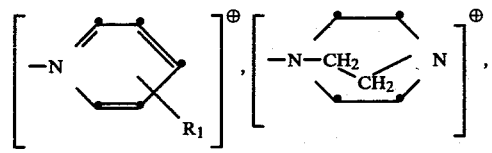

-continued
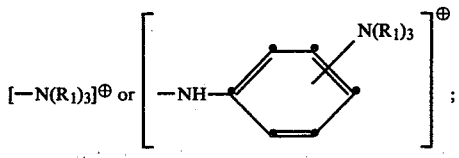

wherein $R_1$ is as previously defined and p is 2 or 3.

R as an unsubstituted or substituted $C_1$–$C_4$alkyl group is an unbranched or branched alkyl group, e.g. a methyl, ethyl, n-propyl or isopropyl, or n-butyl, sec-butyl or tert-butyl group. These groups may be substituted, e.g. by a $C_1$–$C_4$alkoxy group such as the methoxy, ethoxy, n-propoxy and isopropoxy or n-butoxy and isobutoxy group; by cyano; by halogen such as fluorine, chlorine or bromine; by phenyl which may itself be further substituted by e.g. halogen, alkyl and/or alkoxy; by $CONH_2$ or by a carboxamide group which is mono- or disubstituted at the N-atom, e.g. by $C_1$–$C_4$alkyl.

R as an unsubstituted or substituted $C_1$–$C_4$alkoxy group is an unbranched or branched alkoxy group such as the methoxy, ethoxy, n-propoxy and isopropoxy, or n-butoxy and isobutoxy group, which groups may be further substituted.

R as an acylamino group may be e.g. the benzoylamino or acetylamino group. The acylamino group may be substituted e.g. by halogen such as fluorine, chlorine or bromine, or by a —$NH_2$— group or by an amino group which is mono- or disubstituted at the N-atom by e.g. $C_1$–$C_4$alkyl.

R as a halogen atom is preferably a fluorine, chlorine or bromine atom. It is, however, also possible that the substituent R may be present several times in one and the same benzene ring.

In preferred cationic compounds of the formula I, R is hydrogen or an unsubstituted, unbranched $C_1$–$C_4$alkyl group, preferably the methyl group, or an unsubstituted, unbranched alkoxy group, preferably the methoxy group, or halogen, preferably chlorine.

$R_1$ as an unsubstituted or substituted $C_1$–$C_4$alkyl group is an unbranched or branched alkyl group, e.g. the methyl, ethyl, n-propyl and isopropyl or n-butyl and isobutyl group. These groups may be substituted, e.g. by $C_1$–$C_4$alkoxy (unbranched and branched, such as methoxy, ethoxy, n-propoxy and isopropoxy), by cyano or by halogen (fluorine, chlorine or bromine), by phenyl or phenyl which is substituted by $C_1$–$C_4$alkyl or halogen; or by the —$CONH_2$ group. $R_1$ as an alkenyl group is e.g. the allyl group.

In preferred cationic compounds of the formula I, $R_1$ is an unsubstituted, unbranched $C_1$–$C_4$alkyl group, preferably the methyl group.

A

group V, in which both radicals $R_1$ may be linked together to form a carbocyclic 5- or 6-membered ring, is in particular the unsubstituted cyclopentane or cyclohexane ring.

In preferred cationic compounds of the formula I, V is the

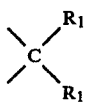

group, wherein each of the radicals $R_1$ is an unbranched, unsubstituted $C_1$-$C_4$alkyl radical. In particular, V is the

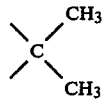

group.

Y as a $-NR_1$ group is a $-N-(C_1-C_4)$alkyl group such as the $-N.CH_3-$, $-N.C_2H_5-$ or $-N.C_3H_7-$ group, wherein the alkyl moiety may additionally be substituted by $-CN$ or halogen.

In preferred cationic compounds of the formula I, Y is the $-NH-$ or $-NR_1$ group, especially the $-N.CH_3$ group.

B as a $[-NH(CH_2)_p-N(R_1)_3]^\oplus$ or $[-NH(CH_2)_p-NH(R_1)_2]^\oplus$ group is e.g.:

| | |
|---|---|
| $-NH-CH_2-CH_2-N^\oplus(CH_3)_3$, | $-NH-CH_2-CH_2-CH_2-N^\oplus(CH_3)_3$, |
| $-NH-CH_2-CH_2-N^\oplus(C_2H_5)_3$, | $-NH-CH_2-CH_2-CH_2-N^\oplus(C_2H_5)_3$, |
| $-NH-CH_2-CH_2-N^\oplus(\text{iso-}C_3H_7)_3$, | $-NH-CH_2-CH_2-CH_2-N^\oplus(\text{iso-}C_3H_7)_3$, |
| $-NH-CH_2-CH_2-N^\oplus(\text{n-}C_3H_7)_3$, | $-NH-CH_2-CH_2-CH_2-N^\oplus(\text{n-}C_3H_7)_3$, |
| $-NH-CH_2-CH_2-NH^\oplus(CH_3)_2$, | $-NH-CH_2-CH_2-CH_2-NH^\oplus(CH_3)_2$, |
| $-NH-CH_2-CH_2-NH^\oplus(C_2H_5)_2$, | $-NH-CH_2-CH_2-CH_2-NH^\oplus(C_2H_5)_2$, |
| $-NH-CH_2-CH_2-NH^\oplus(\text{n-}C_3H_7)_2$, | $-NH-CH_2-CH_2-CH_2-NH^\oplus(\text{n-}C_3H_7)_2$, |
| $-NH-CH_2-CH_2-NH^\oplus(\text{iso-}C_3H_7)_2$, | $-NH-CH_2-CH_2-CH_2-NH^\oplus(\text{iso-}C_3H_7)_2$, |
| $-NH-CH_2-CH_2-NH^\oplus(\text{n-}C_4H_9)_2$, | $-NH-CH_2-CH_2-CH_2-NH^\oplus(\text{n-}C_4H_9)_2$, |
| $-NH-CH_2-CH_2-NH^\oplus(\text{tert.-}C_4H_9)_2$, | $-NH-CH_2-CH_2-CH_2-NH^\oplus(\text{tert.}C_4H_9)_2$, |

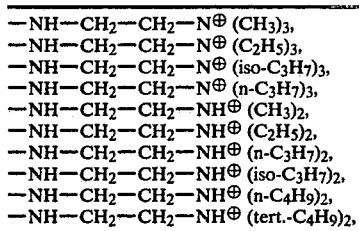

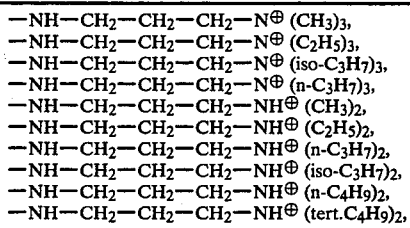

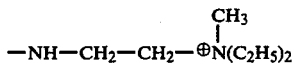

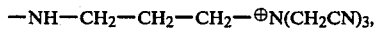

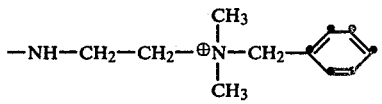

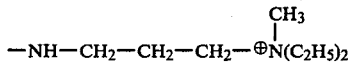

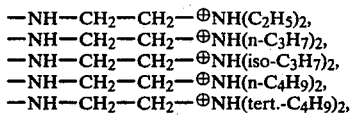

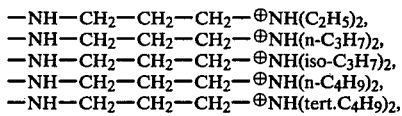

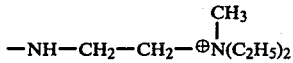

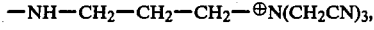

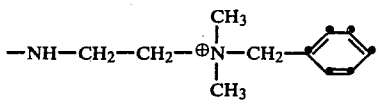

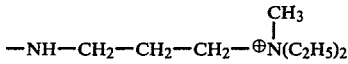

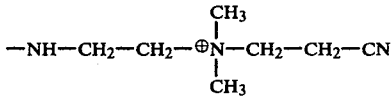

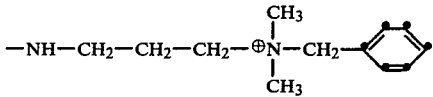

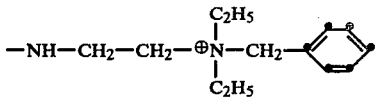

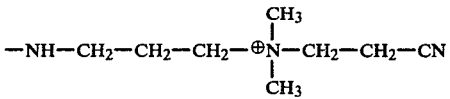

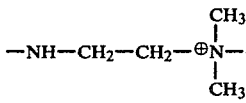

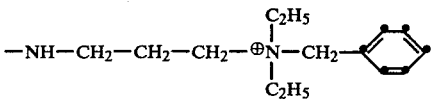

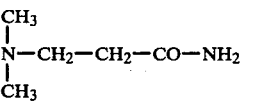

As a $[-N(R_1)_3]^\oplus$ group, B is e.g.:
$-N^\oplus(CH_3)_3$, $-N^\oplus(C_2H_4OCH_3)_3$, $-N^\oplus(C_2H_5)_3$, $-N^\oplus(C_2H_4CN)_3$, -continued

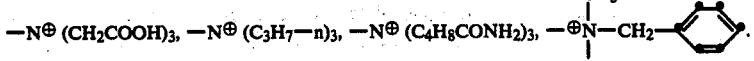

In preferred cationic compounds of the formula I, B has the same meaning as Z or is one of the groups

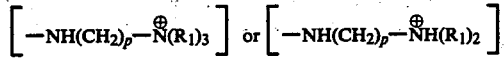

wherein p and $R_1$ have the given meanings.

Suitable anions X are both inorganic and organic anions, e.g. halogen ions such as chloride, bromide or iodide ions; and sulfate, methyl sulfate, aminosulfate, perchlorate, thiocyanate, carbonate, bicarbonate, phosphate, phosphoromolybdate, phosphorotungstate, phosphorotungstomolybdate, benzenesulfonate, naphthalenesulfonate, 4-chlorobenzenesulfonate, oxalate, maleate, formate, acetate, propionate, lactate, succinate, chloroacetate, tartrate, methanesulfonate or benzoate ions. Preferred anions X are the formate, acetate, chloride, sulfate and phosphate ions.

The novel dye salts are conveniently obtained by reacting an aqueous solution of a dye salt of the formula

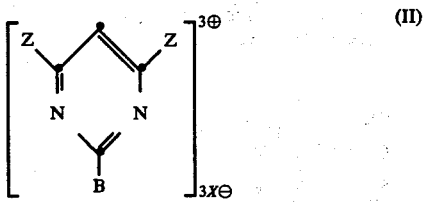

wherein $X^\ominus$ is a water-solubilising anion, with sodium tetrafluoroborate. Suitable water-solubilising anions are preferably the chlorides, bromides, sulfates, methyl sulfates, alkyl sulfates, formates or acetates. On account of their reluctant solubility, the tetrafluoroborates precipitate and may be isolated by filtration.

Those compounds of the formula (II), wherein B is identical to Z, may be obtained by condensing 1 mole of a triamine of the formula (III)

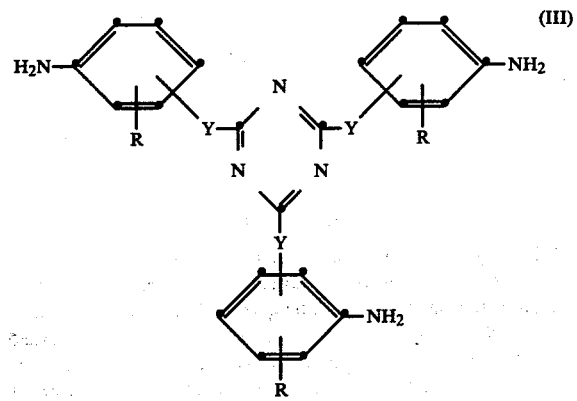

with 3 moles of an aldehyde of the formula IV

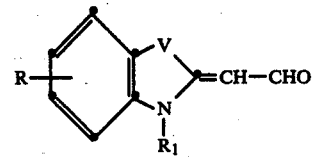

in the presence of an acid HX.

Those compounds of the formula (II), wherein B is not identical to Z, are obtained by condensing 1 mole of a diamine of the formula (V)

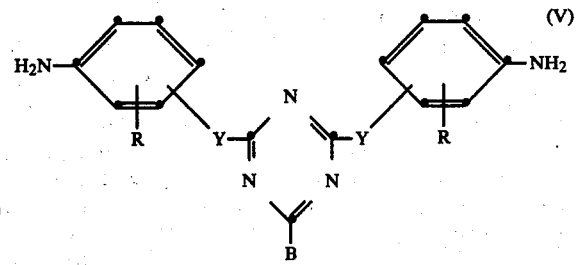

with 2 moles of an aldehyde of the formula (IV), in the presence of an acid HX.

The diamines of the formula (V) and the triamines of the formula (III) are known or they may be prepared by known methods. For example, the diamines of the formula (V) may be prepared by reacting the chlorine atoms of symmetrical trichlorotriazine stepwise with compounds of the formula

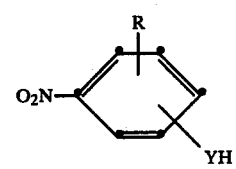

and with B—H, and subsequently reducing the —$NO_2$ group of the condensation product to the —$NH_2$ group.

The aldehydes of the formula (IV) are also known compounds, e.g.

1,3,3-trimethyl-2-methylene-indoline-ω-aldehyde
1,3,3-trimethyl-5-chloro-2-methylene-indoline-ω-aldehyde
1,3,3-trimethyl-5-phenyl-2-methylene-indoline-ω-aldehyde and
1,3,3-trimethyl-5-cyano-2-methylene-indoline-ω-aldehyde.

The condensation of the diamine of the formula (V) and triamine of the formula (III) with the aldehyde of the formula (IV) is carried out in known manner, e.g. in aqueous medium in the temperature range from about 0° to 100° C., in the presence of an acid HX. This acid HX is e.g. an organic acid such as acetic acid or an arylsulfonic acid, preferably benzenesulfonic acid, or an inorganic acid such as hydrochloric acid, sulfuric acid or phosphoric acid. After the condensation reaction, the novel cationic compounds are isolated from the reaction medium and dried.

The novel dye salts are most suitable for colouring polyacrylonitrile in the spinning dope.

For use, the dye salts of this invention are conveniently dissolved in the solvent employed for dissolving the polyacrylonitrile, such as dimethyl formamide, dimethyl acetamide or dimethyl sulfoxide, and then added to the spinning solution. The mixture is homogenised and then spun in conventional manner, e.g. by the dry spinning method or by the wet spinning method, and the fibres so obtained are treated in the customary manner.

The dye salts of the invention have very good solubility in the specified solvents even at room temperature, so that they may also advantageously be used in the form of concentrated solutions containing about 5 to 40% of dye. The solubility of the dyes may be further substantially increased by raising the temperature. In addition, the dye salts have high colour strength on account of the relatively small anion—a property which permits economical dyeing.

Besides the polymers of acrylonitrile, suitable substrates are copolymers of acrylonitrile with other vinyl compounds, e.g. with vinyl chloride, vinyl fluoride, vinylidene chloride, vinyl acetate or vinyl propionate, vinyl pyridine, vinyl imidazole, vinyl pyrrolidone, vinyl alcohol, acrylates, methacrylates or acrylamides, which copolymers must contain at least 70% by weight of acrylonitrile and also acid groups which have been introduced into the polymer as end groups by means of a catalyst or have been introduced or grafted by comonomers containing such acid groups.

lent fastness to thermofixation, steaming, washing and light also merits special mention.

As the tetrafluoroborate dye salts employed in the practice of this invention can be very readily precipitated in coarse-crystalline form and substantially salt-free from the aqueous solutions obtained in the synthesis, the use of spinning solutions which contain these dyes has the particular advantage that inorganic accompanying salts in the aprotic solvents employed as spinning dope do not first have to be isolated before spinning, so that, in particular, additional process steps are avoided. The surprisingly low water-solubility of the dye salts of the invention is a further advantage in view of the bleeding of the dye salt in the aqueous precipitation bath.

The invention is further illustrated by the following Examples.

EXAMPLE 1

8.6 parts (20 mmols) of 2,4,6-s-tri-(4'-aminophenylamino)-triazine and 12.7 parts (63 mmols) of 1,3,3-trimethyl-2-methylene-indoline-ω-aldehyde are stirred in 50 parts of water and 41 parts of methanol. The mixture is heated to 60°–65° C. over the course of about 20 to 30 minutes while simultaneously commencing with the dropwise addition of 32.8 parts of 8% aqueous hydrochloric acid. This addition is complete after 2½ hours. Stirring is continued for 1 hour at the same temperature and then the methanol is distilled off from the reaction mixture in vacuo. The precipitated dye is stirred in 200 parts of cold water, isolated by filtration, washed with a small amount of water and dried at 70° C. Yield: 20.5 parts of an orange dye salt of the formula (VI).

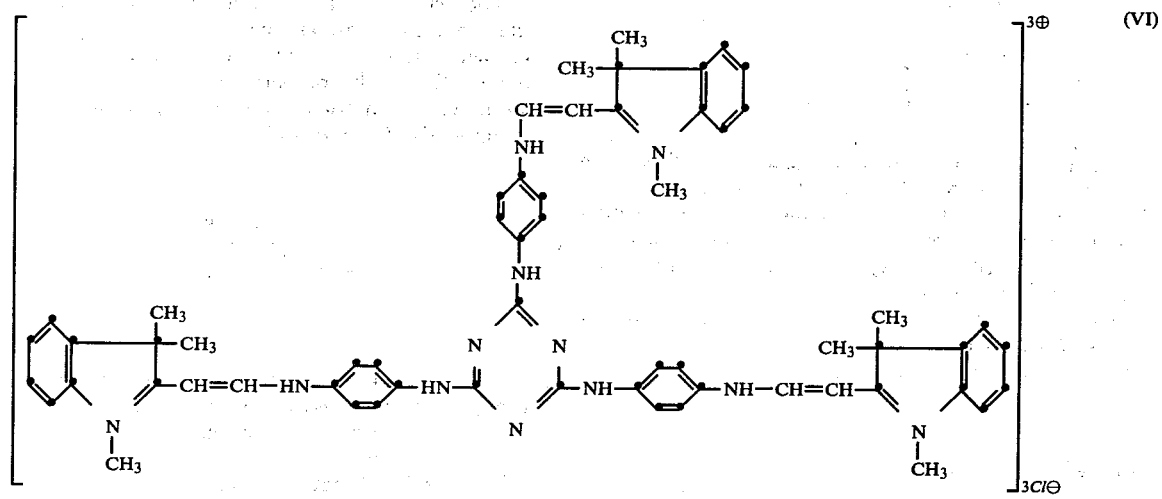

The process of this invention gives completely transparent, clean spinning solutions which cause no clogging or mechanical wear and tear of the spinnerets. The spun filaments and fibres obtained show no tendency to dulling as a result of the substantially molecular dispersion of the dyes of this invention in contrast to most of the pigment dyes used at the present time. Further, the materials coloured with the dyes of this invention by the process of the invention have very good wetfastness properties. The fibres obtained also have extremely good fastness to rubbing owing to the absence of dye aggregate on the surface of the fibres such as can occur in spin dyeing with pigment dyes. In addition, the excel-

EXAMPLE 2

To 835 g of a solution of 60 g of the dye salt of the formula (VI) obtained in Example 1 in dimethyl formamide are added 255 g of an aqueous solution containing 35.5 g of NaBF$_4$. The dye salt (X=BF$_4$) is precipitated by dilution with 2500 ml of water, isolated by filtration, washed with water until free of salt and dried. Yield: 58 g of a yellow powder which has a solubility of 20% in dimethyl formamide but of less than 0.2% in water.

EXAMPLE 3

To 100 parts of a 30% solution of acid modified polyacrylonitrile in dimethyl formamide are added 5 parts of a 5% solution of the dye salt obtained in Example 1 in dimethyl formamide. The spinning solution is homogenised and spun by a dry spinning process known and commonly employed in the art. The filaments obtained are dyed a deep, brilliant yellow shade which additionally has a high gloss. The fastness properties, especially the lightfastness, rub-fastness, fastness to thermofixation, washfastness and fastness to steaming, are exceptionally good.

Coloured filaments of equally good properties are obtained by a wet spinning process commonly employed in the art. The precipitation and drawing baths are only stained to an extremely insignificant extent.

What is claimed is:

1. A dye salt of the formula I

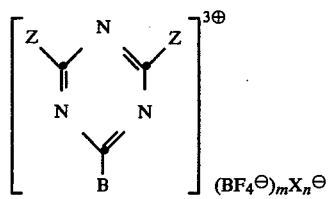 $(BF_4^\ominus)_m X_n^\ominus$     (I)

wherein Z is a radical of the formula

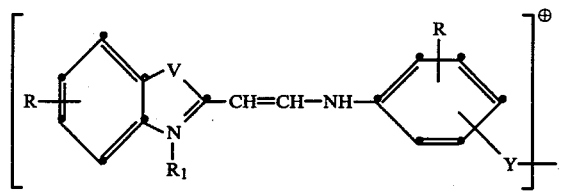

in which R is hydrogen, unsubstituted or substituted $C_1$–$C_4$alkyl, unsubstituted or substituted $C_1$–$C_4$alkoxy, the —$NO_2$ group, unsubstituted or substituted acylamino, or is halogen or the —CN group, $R_1$ is unsubstituted or substituted $C_1$–$C_4$alkyl or is $C_3$–$C_4$alkenyl, V is a sulfur atom or the group

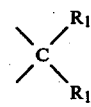

wherein both radicals $R_1$ may be linked together to form a carbocyclic 5- or 6-membered ring, and Y is —NH—, —$NR_1$, —O— or —S—; B has the same meaning as Z or is a cationic radical which differs from Z, X is an anion other than $BF_4^\ominus$, m is 1 to 3 and n is 0 to 2.

2. A dye salt according to claim 1, wherein Z and B are identical radicals.

3. A dye salt according to claim 1, wherein R is hydrogen, $CH_3$, $OCH_3$ or chlorine.

4. A dye salt according to claim 1, wherein $R_1$ is unsubstituted, unbranched $C_1$–$C_4$alkyl.

5. A dye salt according to claim 1, wherein $R_1$ is the —$CH_3$ group.

6. A dye salt according to claim 1, wherein V is the >$C(CH_3)_2$ group.

7. A dye salt according to claim 1, wherein Y is the —NH— or —$NCH_3$— group.

8. A dye salt according to claim 1, wherein X is the formate, acetate, chloride, sulfate or phosphate ion.

9. A process for spin dyeing polymers of acrylonitrile or copolymers containing predominantly acrylonitrile, wherein a dye salt according to claim 1 is added to the spinning solution.

10. Spin-dyed fibres composed of polymers of acrylonitrile or of copolymers containing predominantly acrylonitrile, which fibres contain a dye salt according to claim 1.

* * * * *